United States Patent [19]

Ford

[11] Patent Number: 5,456,373

[45] Date of Patent: Oct. 10, 1995

[54] COVER PLATE ASSEMBLY

[75] Inventor: Douglas K. Ford, Ft. Wayne, Ind.

[73] Assignee: DS Inc., Fort Wayne, Ind.

[21] Appl. No.: 110,813

[22] Filed: Aug. 23, 1993

[51] Int. Cl.[6] .......................... B65D 51/00; H01R 13/66; H02G 3/14
[52] U.S. Cl. .......................... 220/242; 220/3.8; 220/230; 439/38; 439/536
[58] Field of Search .................................. 220/241, 242, 220/3.8, 3.2, 230; 174/66, 67; 439/535, 536, 38, 40, 538

[56] References Cited

U.S. PATENT DOCUMENTS

| | | |
|---|---|---|
| 3,544,703 | 12/1970 | Jones . |
| 3,953,933 | 5/1976 | Goldstein . |
| 3,987,928 | 10/1976 | Mori . |
| 4,009,797 | 3/1977 | Lee . |
| 4,800,239 | 1/1989 | Hill . |
| 4,835,343 | 5/1989 | Graef et al. . |
| 5,180,886 | 1/1993 | Dierenbach et al. . |

*Primary Examiner*—Allan N. Shoap
*Assistant Examiner*—Nathan Newhouse
*Attorney, Agent, or Firm*—Locke Reynolds

[57] ABSTRACT

A cover plate assembly for a wall box mounted in an opening in a wall, the wall box having at least one pair of tabs provided with threaded holes on standard centers adapted to receive screws mounting at least one electrical circuit device within the wall box. The assembly includes a frame situated to overlie the wall surrounding the opening in which the wall box is mounted, the frame having an inside perimeter dimensioned to surround the wall box, and inwardly projecting flanges having openings to overlie the threaded electrical device mounting holes for engagement by the electrical circuit device mounting screws. The assembly also includes a safety plate overlying and fixed to each electrical circuit device, each safety plate having an outer edge dimensioned vertically to overlie the frame inwardly projecting flanges and dimensioned horizontally to cover the space occupied by the electrical circuit device to which each safety place is fixed. A decorative cover plate has an outer edge dimensioned to be received immediately inside the frame and has at least one opening accommodating any outwardly projecting portion of each electrical circuit device mounted within the wall box, and composite magnetic strips hold the decorative cover plate to the frame so the assembly appears to be free from any attachment means.

15 Claims, 2 Drawing Sheets

COVER PLATE ASSEMBLY

BACKGROUND OF THE INVENTION

This invention relates to cover plates for switches and electrical outlets and particularly to a cover plate assembly wherein the cover plate is mounted such that no mounting screws are visible.

Electrical circuit devices such as switches and electrical outlets for receiving standard electrical plugs are usually mounted within wall boxes mounted in an opening in a wall such that only a small portion of the electrical circuit device protrudes outward from the surface of the wall. Wires connecting the electrical devices to sources of power, ceiling lights, or other remotely situated electrical equipment are generally positioned within the wall and coupled to the electrical devices situated within the box. Each electrical circuit device is typically mounted to the box by a pair of screws engaging threaded holes in a pair of tabs integrally provided with the wall box. The threaded holes in the tabs of the wall box are provided at a standard distance from each other to be capable of receiving a wide variety of standard electrical circuit devices.

A conventional cover plate is generally provided with one or more openings for receiving any projecting portion of the wall box mounted electrical circuit device. The cover plate additionally includes one or more openings for receiving screws for fastening the cover plate to the electrical circuit device to cover the wall box and a portion of the wall immediately surrounding the box. Conventional cover plates can be made of a variety of materials including plastic or metal and can be decorated to harmonize with the surrounding decor. Unfortunately, the visible presence of the mounting screws tends to interrupt the otherwise acceptable appearance of the cover plate.

Some prior cover plate assemblies have been designed which eliminate any visible mounting screws. For example, U.S. Pat. No. 3,953,933 discloses a cover plate assembly which consists of a first member adapted to be mounted by screws to the electrical device mounted in the wall box. The first member integrally includes a frame defining portion located at the perimeter of the first member. A decorative second member, the first member is received within the frame defining portion to cover the screws mounting the first member to the electrical device. A plurality of resilient fingers provided on the interior of the frame of the first member resiliently engage the perimeter of the second member to retain the two members in position.

Another example is found in U.S. Pat. No. 3,987,928 which discloses a first or intermediate plate member fixed to the electrical device mounted in the wall box by screws, the first member having a plurality of apertures at selected spaced locations. A decorative cover plate is provided which includes a plurality of integral rods projecting rearwardly from the back surface of the cover plate, the rods being situated to project through and frictionally engage the apertures in the intermediate plate. The outer perimeter of the cover plate lies flush with the wall surrounding the box when the lugs are fully received in the intermediate plate apertures. A similar mounting scheme is also disclosed in U.S. Pat. Nos. 4,835,343 and 5,180,886 except that the integral rearward projecting members are included on a perimeter defining member having a central opening for receiving adapter plates of a variety of designs.

Yet another example is found in U.S. Pat. No. 4,800,239 which discloses a decorative switch plate assembly wherein a base plate having a recessed perimeter is secured to the electrical devices mounted in the wall box by means of the usual mounting screws. One or more decorative plates are then situated on top of the base plate to obscure the presence of the screws. A frame member envelopes the perimeter of the decorative plates and snaps over the base plate with a plurality of small inward projections on the frame member the recessed edge of the base plate.

All of the previously mentioned designs rely on a frictional engagement of projections of one character or another to hold the final cover plate in place to hide the underlying screws. In the event of repeated removal and reinstallation of the final cover plate, the frictional engagement can become diminished or fail completely due to wear or breakage of the projections often mandating replacement of the cover plate assembly as a whole. The present invention seeks to avoid the use of wearable or breakable projections while achieving a secure and safe cover plate assembly having no visible means of attachment.

SUMMARY OF THE INVENTION

A cover plate assembly in accordance with the present invention includes a frame situated to overlie the wall surrounding the opening in which the wall box is mounted. The frame includes inwardly projecting flanges having openings to overlie the threaded mounting holes provided on the tabs of the wall box. The flanges include openings which receive the screws which mount the electrical circuit devices to the wall box, thus holding the frame to the wall and wall box.

A safety plate overlies each of the electrical circuit devices mounted within the wall box, the safety plate being fixed to the electrical devices by means of screw fasteners in the usual fashion. Each safety plate has an outer edge dimensioned vertically to overlie the inwardly projecting flanges of the frame. The safety plates are dimensioned horizontally to cover the space occupied by the electrical circuit device to which each safety plate is fixed. The safety plates are preferably metallic and mounted by metal screws to the electrical devices to provide an electrical ground plane in front of all but the outwardly projecting portion of the electrical circuit devices mounted within the wall box.

A decorative cover plate is received by the frame to cover all of the mounting screws and to leave exposed only the outwardly projecting portions of the electrical devices mounted within the wall box. Magnetic means are provided holding the decorative cover plate to the frame so that the assembly appears to be free from any attachment means.

Preferably the frame includes a decorative outer portion extending outwardly beyond the decorative cover plate. As such, the frame can include an inwardly directed ledge dimensioned to mate with the decorative cover plate outer edge so that the front surface of the frame is flush with a front surface of the decorative cover plate. The frame can have a cross-sectional shape similar to the frame disclosed in U.S. Pat. No. 3,544,703.

In a preferred embodiment, each of the safety plates includes horizontal projections on two diagonally opposite corners adapted to overlie an inside corner of the frame. In the preferred embodiment, the horizontal projections include a diagonal edge connecting the distal end of each projection to a vertical edge of the safety plate and the two corners of the safety plate not including horizontal projections are diagonally truncated such that the horizontal projection of an adjacent safety plate occupies the space vacated by the truncated diagonal corner to assure alignment of adjacent safety plates where two or more electrical devices are mounted in a single wall box.

The magnetic means holding the decorative cover plate to the frame is preferably in the form of a composite magnetic material suspended in an elastomeric matrix and permanently magnetized. Strips of the magnetic material are situated over a laterally inwardly projecting edge or tab of the frame overlying the lateral edges of the wall box. The decorative cover plate, if made of metal, magnetically interacts with the magnetic holding means so the assembly appears to be free of any attachment means. If the decorative cover plate is non-magnetic, then the cover plate can have magnetic strips attached thereto which interact magnetically with the safety plate, frame and/or wall box thereby providing an assembly uninterrupted by any visible fastening or attachment means.

One feature of a cover plate assembly in accordance with the present invention is the presence of a frame defining the outer perimeter of the cover plate assembly which presents a clean, distinct line of pleasing appearance. An advantage of the present invention is the incorporation of metal safety plates overlying each of the electrical circuit devices which are grounded by mounting screws to the frame and through the electrical circuit devices to the wall box thereby diminishing any likelihood of accidental shock. Another feature of the present invention is an assembly which the decorative cover plate is securely retained within a frame yet can be easily removed and replaced with other decorative cover plates that blend with any change in the surrounding decor. Another advantage of the present invention is the lack of any frictional element subject to wear and breakage.

These and other features and advantages will become apparent to those skilled in the art upon consideration of the following description of a preferred embodiment exemplifying the best mode of carrying out the invention contemplated by the inventor. The description refers particularly to the accompanying figures.

DESCRIPTION OF THE PREFERRED EMBODIMENT

Figure 1:
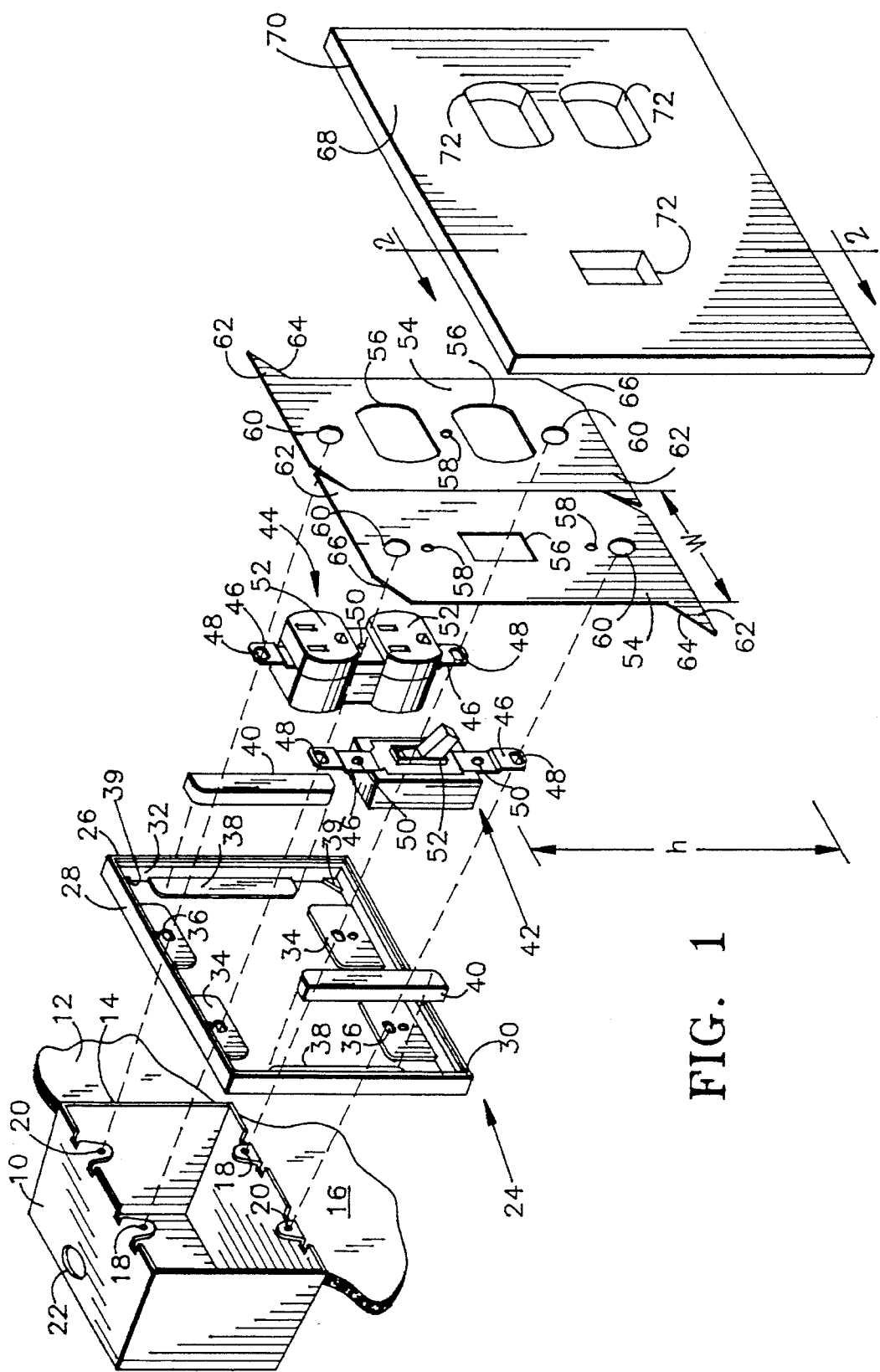
FIG. 1 is an exploded view of a cover plate assembly in accordance with the present invention incorporating an electrical switch and an electrical outlet within a wall mounted box.

A cover plate assembly 10, in accordance with the present invention, is shown in an exploded view in FIG. 1. In that figure, a standard wall box 10 is shown mounted in an opening in a wall 12 in a conventional manner such that a front edge 14 of the wall box is flush with the outer surface 16 of the wall. The wall box 10 is of standard design and includes two pairs of inwardly directed tabs 18. Each tab 18 includes a threaded hole 20 adapted to receive screws for mounting any of a variety of standard electrical circuit devices within the wall box 10. The threaded holes 20 are separated from each other by set standardized distances. One or more openings 22 are provided in the side or back walls of the electrical box 10 for receiving electrical wires not shown from a remotely located source of power and other electrical devices.

A frame 24 is situated to overlie the wall 12 immediately surrounding the opening to which the wall box 10 is mounted. The frame has a decorative outer portion 26 including an outwardly facing edge 28 and a forwardly facing lip 30. The inside perimeter 32 of the frame 24 is dimensioned to surround the wall box 10. Sets of flanges 34 project inwardly from the top and bottom of the frame to overlie tabs 18 in box 10. Each of the flanges 34 includes an opening 36 which can be aligned with the threaded holes 20 in tabs 18 of wall box 10. The openings 36 are slightly larger than the threaded holes 20 so a screw threaded fastener engaging the threads of hole 20 is not restricted by dimensions of the opening 36. The larger dimensioned openings of holes 36 also permit some modest amount of alignment of frame 24 with respect to wall box 10. The frame also includes laterally inwardly projecting flanges 38 which overlie the sides of box 10 and interact with magnetic holding strips 40. The flanges 34 and 38 can be combined to define a single inwardly projecting flange around the entire inside perimeter of the frame 24.

Figure 2:
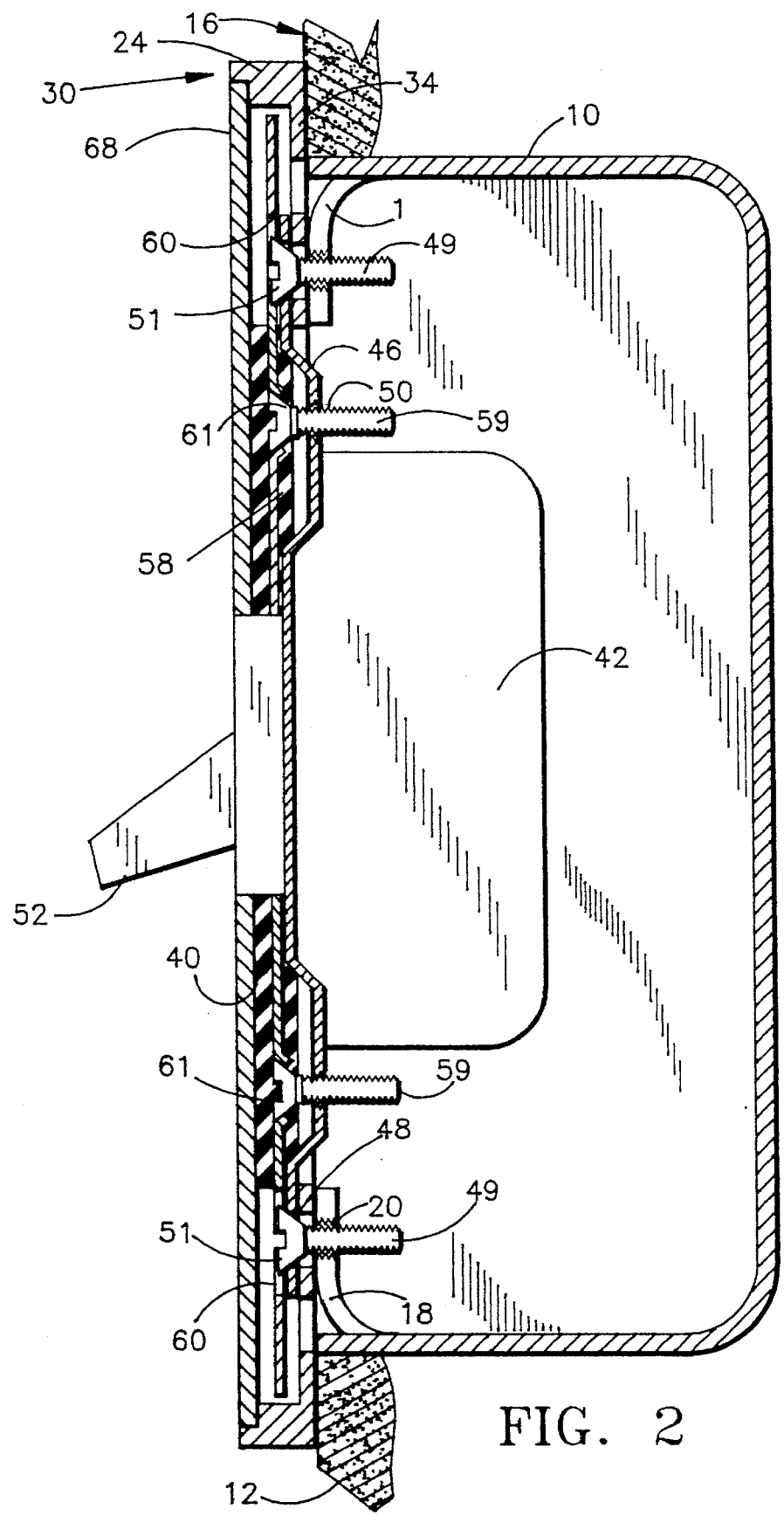
FIG. 2 is a sectional view of the assembly shown in FIG. 1 taken along lines 2—2.

Two representative electrical circuit devices 42 and 44 are shown aligned for mounting within the wall box 10. The electrical switch 42 and the electrical outlet 44 each include mounting tabs 46 which overlie flanges 34. Each of the tabs 46 includes an opening 48 adapted to be aligned with openings 36 in flanges 34 of frame 24 and threaded openings 20 in tabs 18 of box 10. Screw threaded fasteners 49 shown only in FIG. 2 are inserted through openings 48 and 36 and engage the threads of openings 20. The fasteners 49 include heads 51 dimensioned sufficiently large to insure that the electrical devices 42 and 44, together with frame 24 are securely mounted to the tabs 18 of box 10. Each of the electrical devices 42 and 44 includes one or more threaded openings 50 and includes forwardly projecting portions 52 which are intended to project through the cover plate assembly as a whole for utilization in a conventional manner.

A cover plate assembly, in accordance with the present invention, also includes safety plates 54 which are preferably made of metal to form a suitable electrical ground. Each safety plate 54 includes one or more openings 56 adapted to receive the forwardly projecting portions 52 of the electrical devices 42 and 44 mounted within box 10. Additional openings 58 are provided to receive screw threaded fasteners 59 to be engaged in threaded openings 50 in the electrical devices 42 and 44. The fasteners 59, shown only in FIG. 2, include a head portion 61 which engages openings 58 to secure the safety plates 54 to the electrical devices 42 and 44. The safety plates 54 have a vertical dimension h small enough to be received within the inside perimeter 32 of frame 24, but sufficiently large to overlie flanges 34. Openings 60 are provided to align with openings 48 in the electrical devices 42 and 44, openings 36 in flanges 34 of frame 24, and openings 20 in tabs 18 of box 10. The size of opening 60 is such that the heads 61 of the screw threaded fasteners 59 securing the electrical devices 42 and 44 and the frame 24 to the box 10 do not engage the edges of opening 60.

The safety plates 54 include horizontal projecting portions 62 which extend laterally beyond the width w of each safety plate 54. The horizontal projections are situated on diagonally opposite corners and are adapted to engage one or more corners 39 on the inside perimeter 32 of frame 24. The horizontal projections 62 are defined, in part, by a diagonal edge 64. The corners of the safety plates 54 which do not incorporate a horizontal projection 62 include a truncated diagonal edge 66. The truncated edges 66 and diagonal edges 64 of the horizontal projection 62 are adapted to interfit to aid in the proper positioning of the underlying electrical devices 42 and 44. The position of the electrical devices 42 and 44 can be adjusted after the safety plates 54 have been secured in place since the openings 60 are sufficiently large that the heads 61 of the mounting screws 59 mounting the electrical devices to the wall box 10 are free to be manipulated through the openings 60.

The cover plate assembly of the present invention includes a decorative cover plate 68 having an outer edge 70 dimensioned to be received immediately inside the forwardly facing lip 30 of frame 24. The decorative cover plate includes opening 72 designed to receive the forwardly projecting portions 52 of the electrical devices 42 and 44. The decorative cover plate 68 is otherwise free from any openings and is intended to completely cover and obscure the various fasteners 49 and 59 holding the remaining portion of the cover plate assembly together. The decorative cover plate is retained in position by the magnetic strips 40 which interact with the cover plate 68, the flanges 38 of frame 24, and the sides of wall box 10 so the assembly as a whole appears to be free from any attachment means whatsoever.

Although the present invention has been described in connection with the preferred embodiment illustrated in the accompanying figures, other variations and modifications may be apparent to those skilled in the art which come within the scope of the present invention as defined by the claims which follow.

I claim:

1. A cover plate assembly for a wall box mounted in an opening in a wall, the wall box having at least one pair of tabs provided with threaded holes on standard centers adapted to receive screws mounting at least one electrical circuit device within the wall box, the assembly comprising:

a frame for overlying the wall surrounding the opening in which the wall box is mounted, the frame having an inside perimeter dimensioned for surrounding the wall box, and inwardly projecting flanges having openings for overlying the threaded electrical device mounting holes for engagement by the electrical circuit device mounting screws, a safety plate for overlying and fixing to each electrical circuit device, each safety plate having an outer edge dimensioned vertically to overlie the frame inwardly projecting flanges and dimensioned horizontally for covering the space occupied by the electrical circuit device to which each safety plate is fixed, and horizontal projections on two diagonally opposite corners adapted to engage a corner of the inside perimeter of the frame, a decorative cover plate having an outer edge dimensioned to be received immediately inside the frame and having at least one opening for accommodating any outwardly projecting portion of each electrical circuit device mounted within the wall box, and magnetic means for magnetically holding the decorative cover plate to the frame so the assembly appears to be free from any attachment means.

2. The cover plate assembly of claim 1 wherein the frame inside perimeter includes corners adapted to be covered by and engage said safety plate horizontal projections.

3. The cover plate assembly of claim 1 wherein each of the safety plate horizontal projections includes a diagonal edge connecting a distal end of the projection to a vertical edge of the safety plate.

4. The cover plate assembly of claim 3 wherein each safety plate also includes two truncated diagonal corners, the horizontal projection of any adjacent safety plate occupying the space vacated by one of the truncated diagonal corners.

5. A cover plate assembly for a wall box mounted in an opening in a wall, the wall box having at least one pair of tabs provided with threaded holes on standard centers adapted to receive screws mounting at least one electrical circuit device within the wall box, the assembly comprising:

a frame for overlying the wall surrounding the opening in which the wall box is mounted, the frame having an inside perimeter dimensioned for surrounding the wall box, and inwardly projecting flanges having openings for overlying the threaded electrical device mounting holes for engagement by the electrical circuit device mounting screws, a safety plate for overlying and fixing to each electrical circuit device, each safety plate having an outer edge dimensioned vertically to overlie the frame inwardly projecting flanges and dimensioned horizontally for covering the space occupied by the electrical circuit device to which each safety plate is fixed, a decorative cover plate having an outer edge dimensioned to be received immediately inside the frame and having at least one opening for accommodating any outwardly projecting portion of each electrical circuit device mounted within the wall box, and magnetic means for magnetically holding the decorative cover plate to the frame so the assembly appears to be free from any attachment means, the frame inside perimeter including horizontally inwardly projecting tabs for engaging said magnetic means.

6. The cover plate assembly of claim 5 wherein said horizontally inwardly projecting tabs are integral with said inwardly projecting flanges thereby defining a single inwardly projecting flange around the entire inside perimeter of the frame.

7. A cover plate assembly for a wall box mounted in an opening in a wall, the wall box having at least one pair of tabs provided with threaded holes on standard centers adapted to receive screws mounting at least one electrical circuit device within the wall box, each electrical circuit device having at least one portion projecting outwardly from the wall box, the assembly comprising:

a frame for overlying the wall surrounding the opening in which the wall box is mounted, the frame having a decorative outer portion, an inside perimeter dimensioned for surrounding the wall box, and inwardly projecting flanges having openings for overlying the threaded electrical device mounting holes for engagement by the electrical circuit device mounting screws, a safety plate for overlying and fixing to each electrical circuit device, each safety plate having an outer edge dimensioned vertically to overlie the frame inwardly projecting flanges and dimensioned horizontally for covering the space occupied by the electrical circuit device to which the safety plate is fixed, each safety plate including horizontal projections on two diagonally opposite corners, at least one of the projections engaging a corner of the inside perimeter of the frame, a decorative cover plate having an outer edge dimensioned to be received immediately inside the decorative outer portion of the frame and having at least one opening for accommodating the outwardly projecting portion of each electrical circuit device mounted within the wall box, and magnetic means situated between the frame and decorative cover plate for magnetically holding the decorative cover plate to the frame so the assembly appears to be free from any attachment means.

8. The cover plate assembly of claim 7 wherein each of the safety plate horizontal projections includes a diagonal edge connecting a distal end of the projection to a vertical edge of the safety plate, and wherein each safety plate also includes two truncated diagonal corners, the horizontal projection of any adjacent safety plate occupying the space vacated by one of the truncated diagonal corners.

9. The cover plate assembly of claim 8 wherein the frame inside perimeter includes corners adapted to engage said safety plate horizontal projections.

10. The cover plate assembly of claim 8 wherein the frame outer portion includes horizontally inwardly projecting tabs for engaging said magnetic means and an inwardly directed ledge dimensioned to made with the decorative cover plate outer edge so a front surface of the frame is flush with a front surface of the decorative cover plate.

11. A cover plate assembly for a wall box mounted in an opening in a wall, the wall box having at least one pair of tabs provide with threaded holes on standard centers adapted to receive screws mounting at least one electrical circuit device within the wall box, each electrical circuit device having at least one portion projecting outwardly from the wall box, the assembly comprising:

a frame for overlying the wall surrounding the opening in which the wall box is mounted, the frame having a decorative outer portion, an inside perimeter dimensioned for surrounding the wall box, and inwardly projecting flanges having openings for overlying the threaded electrical device mounting holes for engagement by the electrical circuit device mounting screws, a safety plate for overlying and fixing to each electrical circuit device, each safety plate having an outer edge dimensioned vertically to overlie the frame inwardly projecting flanges and dimensioned horizontally for covering the space occupied by the electrical circuit device to which the safety plate is fixed, each safety plate including horizontal projections on two diagonally opposite corners, at least one of the projections engaging a corner of the inside perimeter of the frame, each of the safety plate horizontal projections including a diagonal edge connecting a distal end of the projection to a vertical edge of the safety plate, each safety plate also including two truncated diagonal corners, the horizontal projection of any adjacent safety plate occupying the space vacated by one of the truncated diagonal corners, a decorative cover plate having an outer edge dimensioned to be received immediately inside the decorative outer portion of the frame and having at least one opening for accommodating the outwardly projecting portion of each electrical circuit device mounted within the wall box, and magnetic means situated between the frame and decorative cover plate for magnetically holding the decorative cover plate to the frame so the assembly appears to be free from any attachment means.

12. The cover plate assembly of claim 11 wherein the frame outer portion includes horizontally inwardly projecting tabs for engaging said magnetic means and an inwardly directed ledge dimensioned to made with the decorative cover plate outer edge so a front surface of the frame is flush with a front surface of the decorative cover plate, and wherein the frame inside perimeter includes corners adapted to engage said safety plate horizontal projections.

13. A safety plate for use in a cover plate assembly for a wall box mounted in an opening in a wall, the wall box having at least one pair of tabs provide with threaded holes on standard centers adapted to receive screws mounting at least one electrical circuit device within the wall box, each electrical circuit device having at least one portion projecting outwardly from the wall box, the assembly including a frame situated to overlie the wall surrounding the opening in which the wall box is mounted, the frame having an inside perimeter dimensioned to surround the wall box, and inwardly projecting flanges having openings to overlie the threaded electrical device mounting holes for engagement by the electrical circuit device mounting screws, the safety plate comprising:

a generally rectangular metallic plate for overlying and fixing to each electrical circuit device, each safety plate having an outer edge dimensioned vertically for overlying the frame inwardly projecting flanges and dimensioned horizontally for covering the space occupied by the electrical circuit device to which the safety plate is fixable, each safety plate including horizontal projections on two diagonally opposite corners, at least one of the projections capable of engaging a corner of the inside perimeter of the frame, each of the safety plate horizontal projections including a diagonal edge connecting a distal end of the projection to a vertical edge of the safety plate, each safety plate also including two truncated diagonal corners, the horizontal projection of any adjacent safety plate occupying the space vacated by one of the truncated diagonal corners.

14. The safety plate of claim 13 further comprising at least one opening for accommodating any outwardly projecting portion of the electrical circuit device to which the safety plate is fixed.

15. The safety plate of claim 14 wherein at least one of said horizontal projection distal ends is capable of engaging corners integral with the frame inside perimeter.

* * * * *